United States Patent [19]
Mattar et al.

[11] Patent Number: 5,926,096
[45] Date of Patent: Jul. 20, 1999

[54] METHOD AND APPARATUS FOR CORRECTING FOR PERFORMANCE DEGRADING FACTORS IN A CORIOLIS-TYPE MASS FLOWMETER

[75] Inventors: Wade M. Mattar, Wrentham; James H. Vignos, Needham Heights, both of Mass.

[73] Assignee: The Foxboro Company, Foxboro, Mass.

[21] Appl. No.: 08/614,977

[22] Filed: Mar. 11, 1996

[51] Int. Cl.[6] .................................................. G08B 21/00
[52] U.S. Cl. ...................................... 340/606; 73/861.356
[58] Field of Search ....................... 340/606; 73/861.355, 73/861.356, 861.357

[56] References Cited

U.S. PATENT DOCUMENTS

| | | | |
|---|---|---|---|
| 4,879,911 | 11/1989 | Zolock | 73/861.38 |
| 4,891,991 | 1/1990 | Mattar et al. | 73/861.38 |
| 4,911,006 | 3/1990 | Hagarten et al. | 73/861.38 |
| 4,911,020 | 3/1990 | Thompson | 73/861.38 |
| 4,934,195 | 6/1990 | Hussain | 73/861.38 |
| 4,934,196 | 6/1990 | Romano | 73/861.38 |
| 4,996,871 | 3/1991 | Romano | 73/32 A |
| 5,027,662 | 7/1991 | Titlow et al. | 73/861.38 |
| 5,050,439 | 9/1991 | Thompson | 73/861.38 |
| 5,054,326 | 10/1991 | Mattar | 73/861.38 |
| 5,271,281 | 12/1993 | Natter et al. | 73/861.38 |
| 5,343,764 | 9/1994 | Mattar et al. | 73/861.38 |
| 5,400,653 | 3/1995 | Kalotay | 73/861.356 |
| 5,497,665 | 3/1996 | Cage et al. | 73/861.356 |
| 5,497,666 | 3/1996 | Patten et sl. | 73/861.356 |
| 5,555,190 | 9/1996 | Derby et al. | 73/861.356 |
| 5,594,180 | 1/1997 | Carpenter et al. | 73/861.356 |

*Primary Examiner*—Daniel J. Wu
*Assistant Examiner*—John Tweel, Jr.
*Attorney, Agent, or Firm*—Fish & Richardson PC

[57] ABSTRACT

Drivers and sensors in Coriolis-type mass flowmeters are used to monitor and predict flowmeter failure modes due to mechanical deterioration during meter operation. The relative values of two different signals, e.g, resonant frequencies, associated with Coriolis flow conduit motion are monitored as an indicator of excessive mechanical deterioration and also used to compensate for shifts in meter factor. The noise spectrum of the sensor output is also monitored to indicate mechanical fatigue of the tubes. Energy loss in the vibrating tubes is monitored as an indication of fatigue to determine tube failure by determining the drive power needed to maintain constant velocity oscillation or measuring the decay rate of the drive signal when driver power is interrupted.

20 Claims, 8 Drawing Sheets

METHOD AND APPARATUS FOR CORRECTING FOR PERFORMANCE DEGRADING FACTORS IN A CORIOLIS-TYPE MASS FLOWMETER

BACKGROUND OF THE INVENTION

The invention relates to Coriolis-type mass flowmeters.

In response to the need to measure the quantity of material being delivered through pipelines, numerous types of flowmeters have evolved from a variety of design principles. One of the more widely used types of flowmeters is based on volumetric flow. Volumetric flowmeters are at best inaccurate in determining the quantity of material delivered, where the density of the material varies with temperature of feedstock, where the fluid being pumped through the pipeline is polyphase such as a slurry or where the fluid is non-Newtonian such as mayonnaise or other food products. In addition, the metered delivery of liquid components for chemical reactions, which are in effect mass reactions where proportions are critical, may be poorly served by volumetric flowmeters.

A mass flowmeter, on the other hand, is an instrument that provides a direct indication of the mass, as opposed to volume, of material being transferred through the pipeline. Mass flowmeters measure mass in a moving stream by applying a force to the stream and detecting and measuring some consequence of an acceleration that results from the applied force.

One class of mass measuring flowmeters, referred to as Coriolis-type mass flowmeters, is based on the well-known Coriolis effect. Examples of Coriolis-type mass flowmeters are described in U.S. Pat. No. 4,891,991 to Mattar et al., entitled "Coriolis-Type Mass Flowmeter," issued on Jan. 9, 1990, U.S. Pat. No. 4,911,020 to Thompson, entitled "Coriolis-Type Mass Flowmeter Circuitry," issued on Mar. 27, 1990, U.S. Pat. No. 5,048,350 to Hussain et al., entitled "Electromagnetic Driver and Sensor," issued on Sep. 17, 1991 and U.S. Pat. No. 5,054,326 to Mattar, entitled "Density Compensator for Coriolis-Type Mass Flowmeters," issued on Oct. 8, 1991, all assigned to the assignee of the present invention and incorporated herein by reference in their entirety.

Such Coriolis-type mass flowmeters induce a Coriolis force by oscillating a conduit sinusoidally about a pivot axis orthogonal to the length of the pipe. In such a mass flowmeter, Coriolis forces result due to the flow of mass through the oscillating conduit. The Coriolis reaction force experienced by the flowing mass is transferred to the conduit and is manifested as a deflection or offset of the conduit in the plane of rotation in the direction of the Coriolis force.

A major difficulty in these oscillatory systems is that the deflection due to the Coriolis force is relatively small compared not only to the drive deflection but even to extraneous vibrations. An advantage is that an oscillatory system can employ the inherent bending resiliency of the conduit as a hinge or pivot point for oscillation to obviate the need for separate rotary or flexible joints, and can thereby improve mechanical reliability and durability. Moreover, an oscillatory system allows use of the resonant frequency of vibration of the conduit as the drive frequency, which reduces the drive energy needed.

Energy is supplied to the conduit (or conduits) by a driving mechanism that oscillates the conduit through application of a periodic force. One type of driving mechanism is exemplified by an electromechanical driver that exhibits motion proportional to an applied voltage. In an oscillating flowmeter, the applied voltage is periodic, and is generally sinusoidal. The periods of the input voltage, the resulting driving force, and the motion of the conduit are chosen to match one of the resonant modes of vibration of the conduit. As mentioned above, this reduces the energy needed to sustain oscillation.

When a flowmeter operated with extremely caustic or abrasive fluids for long periods of time, the conduit (or conduits) of the meter can be damaged by wear, causing, in the short term, inaccurate readings and, ultimately, failure of the conduit or tube. Because these flowmeters operate for long periods of time in normal use, catastrophic tube failure is an ever present danger, and, depending on the nature of the process fluid, can cause substantial damage to the facility housing the flowmeter. Accordingly, prevention of tube failure is advantageous and desirable.

The three most likely failure mechanisms in Coriolis flowmeters are listed below. First, flowmeters may fail from corrosion of the tubes due to the flow of caustic process fluids that results in blowout or cracking. Second, flowmeters may fail from erosion of the tubes due to the flow of an abrasive process fluid through the tube that progressively reduces wall thickness until the tube cannot support the process fluid at pressure. Third, in some flowmeters that use vibrating tubes, vibration induced high-cycle fatigue of the tubes may result in tube failure.

All of the failure mechanisms are interrelated to some degree. Corrosion of the tubes would invite fatigue failure (possibly within the normal lifetime of the meter), whereas even minimal fatigue effects might promote corrosion by allowing the process fluid to attack the tubes in a microcracked or stressed area. Further, corrosion and erosion go hand in hand. Tubes that are being eroded by the process fluid would be much more susceptible to corrosion. Such tubes would likely fail in a section that has eroded and subsequently corroded. For the corrosion and erosion mechanisms, the pressure rating of the tube drops until there is a blowout. Pure fatigue failure results in the tube simply breaking. Finally, any impurities in the metal of the tubes could provide a site for corrosion failure.

SUMMARY OF THE INVENTION

The present invention probes the frequency domain associated with the Coriolis flowmeter for signs of mechanical deterioration and makes effective use of drivers and sensors, and signals therefrom, in Coriolis-type mass flowmeters to monitor and predict, during meter operation, flowmeter failure modes due to mechanical deterioration and to provide compensation therefor.

Generally, in one aspect of the invention, a changing ratio of values of two different signals associated with Coriolis flow conduit motion is monitored as an indicator of excessive mechanical deterioration. In one embodiment, two resonant frequencies of the conduit are compared, preferably by ratioing the drive frequencies in the antisymmetrical and symmetrical modes of oscillation. In the preferred embodiment, dual drivers used in normal meter operation to drive the conduit in one mode are employed during testing to drive the conduit in the other mode.

In another aspect of the invention, the noise spectrum of the sensor output is monitored to indicate mechanical fatigue of the conduit.

In another aspect of the invention, energy loss in the vibrating tubes is monitored as an indication of fatigue that may be a prelude to tube failure. For this purpose, a step impulse can be applied via the drivers to promote a vibrational mode, and the decay rate of that mode can then be observed. Differences in decay rates over time are indicative of increased damping or decreasing energy storage relative to energy loss (i.e., decreasing mechanical Q). A preferred way of monitoring tube failure is to monitor a change in power delivered to the tubes over time to maintain a constant vibrational tube velocity in a given mode.

Combinations of the above techniques are also useful in evaluating the overall mechanical condition of the Coriolis flow tubes, particularly since different failure modes may progress more or less rapidly than other modes and statistical patterns or profiles may be more effective in predicting failure with several detection strategies in play at once. A method of compensating a meter factor through use of a ratio of resonances in drive and Coriolis modes is also presented.

The foregoing techniques provide an on line method of monitoring the mechanical condition of the coriolis flowmeter using the same drivers and sensors and, in some cases, circuitry already present for operating the meter, to predict tube failure in advance and compensate for deterioration.

DESCRIPTION OF THE PREFERRED EMBODIMENTS

Mechanical Design

Described herein is a specific tubular configuration in which the tubes are oriented perpendicularly with respect to the direction of the process flow, i.e., the direction of flow in a straight section of pipeline in which the meter is to be inserted. The invention is equally applicable to in-line and other tubular configurations including single and double tubes. The implementations illustrated herein are designed for flowmeters for a variety of products including, for example, petroleum based fuels. The flowmeter and electromechanical drivers and sensors described herein are applicable, of course, to a wide variety of other specific designs for the same or different applications. A specific example of a flowmeter useful for implementing the present invention is given by the Foxboro I/A Series Mass Flowmeter, available from The Foxboro Company of Foxboro, Mass.

Figure 1:
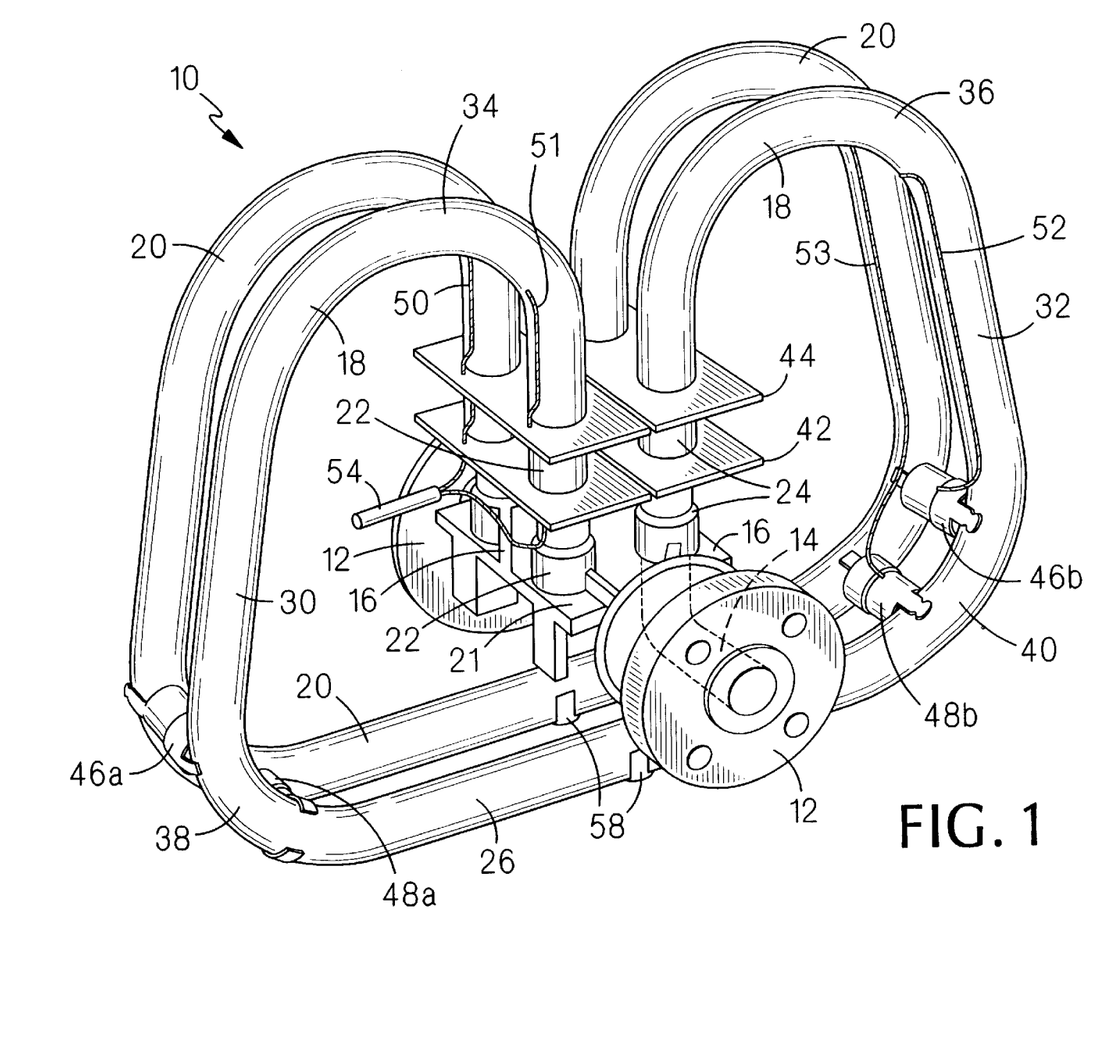
FIG. 1 is a perspective view of a Coriolis flowmeter of the present invention.
Figure 2:
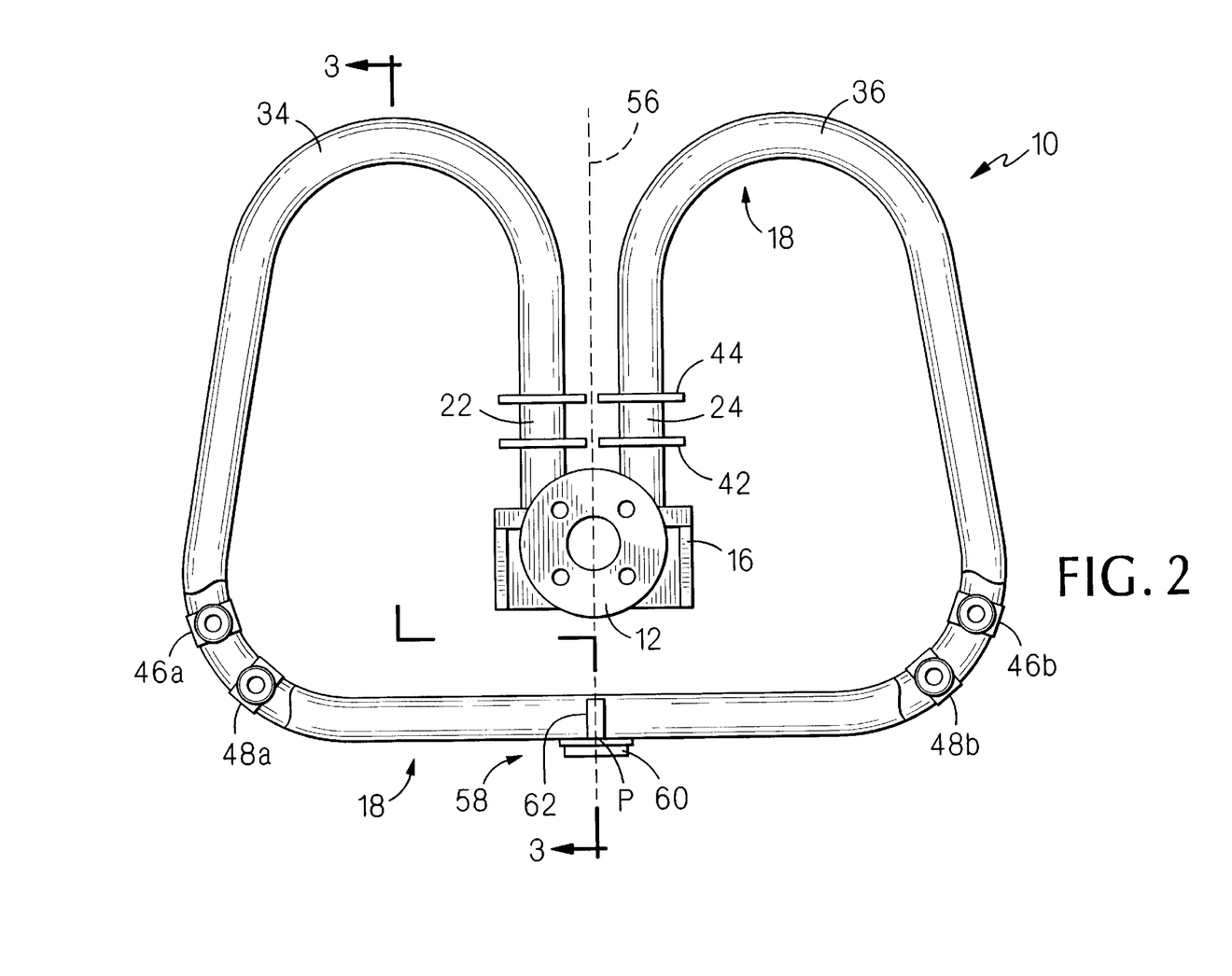
FIG. 2 is a side view of the flowmeter of FIG. 1.

FIGS. 1 and 2 illustrate a double loop, dual drive/sensor system with mainly torsional loading of the tube ends where they are connected to a single rigid central manifold connected in line with the process flow.

The mass flowmeter 10 of FIGS. 1 and 2 is designed to be inserted in a pipeline (not shown) which has had a small section removed or reserved to make room for the meter. The pipeline is equipped with opposing spaced flanges (not shown) which mate with mounting flanges 12 that are welded to short sections of pipe 14 connected to a central manifold block 16 supporting the two parallel planar loops 18 and 20. The configuration and shape of loops 18 and 20 are essentially identical. Thus, the description of the shape of loop 18 holds true for loop 20 as well, except where noted. Manifold block 16 is preferably a casting in the general shape of a solid rectangular block with a flat horizontal upper surface or top 21 and integral pipe sections 14. Various portions of the manifold block may be removed to reduce weight. The ends of loop 18 comprise straight, preferably vertical, parallel inlet and outlet sections or legs 22 and 24 securely affixed, e.g., by butt welding, to the top of the manifold surface 21 in close proximity to each other. The base of loop 18 is a long straight section 26 passing beneath the bottom face of manifold block 16. The long straight section 26 at the base of the loop 18 is connected to upright legs 22 and 24 by respective diagonal sections 30 and 32. The four junctions between the various straight segments of the loop 28 are rounded by large radii turns to afford as little resistance to flow as possible. In particular, upright legs 22 and 24 are connected to the respective diagonal segments 30 and 32 by means of apex turns 34 and 36. The ends of the long straight base section 26 are connected to the respective ends of the diagonal segments 30 and 32 by lower rounded turns 38 and 40.

The parallel inlet/outlet sections 22, 24 of both loops 18 and 20 pass through correspondingly apertured isolation plates or node plates 42 and 44 which are parallel to upper manifold surface 21 and spaced from the manifold surface by a predetermined distance. Welded to the tube, the node plates serve as stress isolation plates and define a common mechanical ground for each loop.

Figure 3:
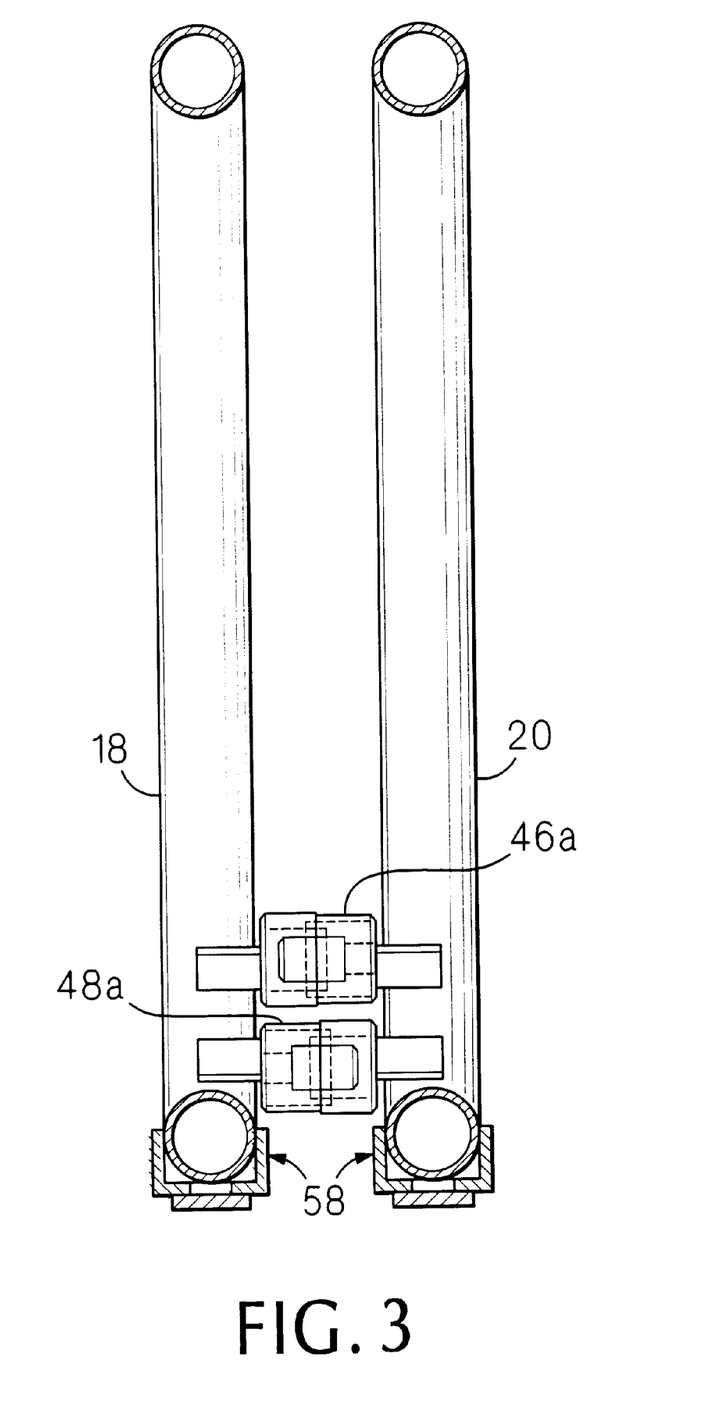
FIG. 3 is a sectional view of the flowmeter of FIG. 2 taken along lines 3—3 showing the relative locations of a driver and a sensor.

Referring to FIGS. 1–3, electromechanical driver and sensor assemblies are attached between loops 18 and 20 on each of the lower rounded turns 38 and 40. Each assembly consists of an electromagnetic driver 46 and sensor 48 disposed closely to each other, between the tubes 18 and 20. The electrical signals are transferred from driver and detection circuitry (shown schematically in FIGS. 5–8) to the drivers and sensors through wire leads 50–53 which run along the exterior of the tubes, through apertured isolation plates 42 and 44, and are connected to an electrical socket 54.

By energizing the driver pairs 46 on opposite ends of the tubes with current of equal magnitude but opposite sign (180 degrees out-of-phase), straight section 26 is caused to rotate about its co-planar perpendicular bisector 56 which intersects the tube at point P as shown in FIG. 2. The drive rotation is thus preferably in a horizontal plane about point P. The perpendicular bisectors for the straight sections of both loops preferably lie in a common plane of symmetry for both loops.

Repeatedly reversing (e.g., controlling sinusoidally) the energizing current of the drivers causes straight section 26 of loop 18 to execute an oscillatory motion in the horizontal plane about line 56—56, the axis of symmetry of the loop. The motion of straight section 26 sweeps out a bow tie shape as it oscillates about a node where there is a local minimum amplitude of oscillation. The entire lateral excursion of the loop at the lower rounded turns 38 and 40 is small, on the order of 1/16 of an inch for a two foot long straight section 26 for a one inch pipe. This displacement is coupled to the upright parallel legs 22 and 24 as torsional deflections about the axes of the legs 22 and 24 beginning at the node plate 44. Complementary oscillatory motion is induced in the straight section of the other loop 20.

Figure 4A:
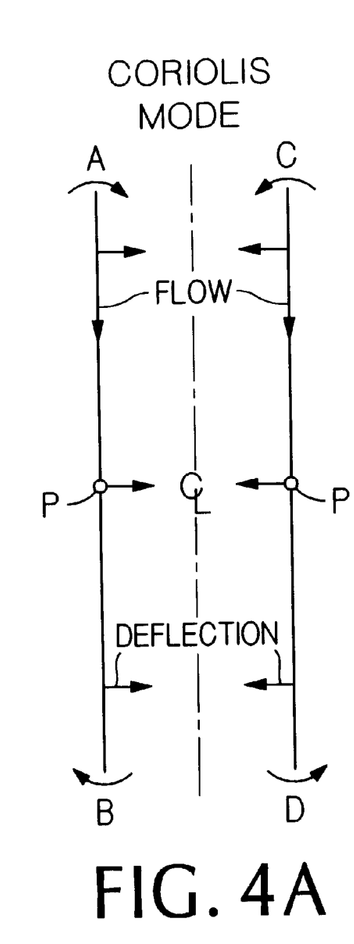
FIGS. 4a, 4b, and 4c are schematic representations of three modes of motion of the flowmeter of FIGS. 1 and 2.
Figure 4B:
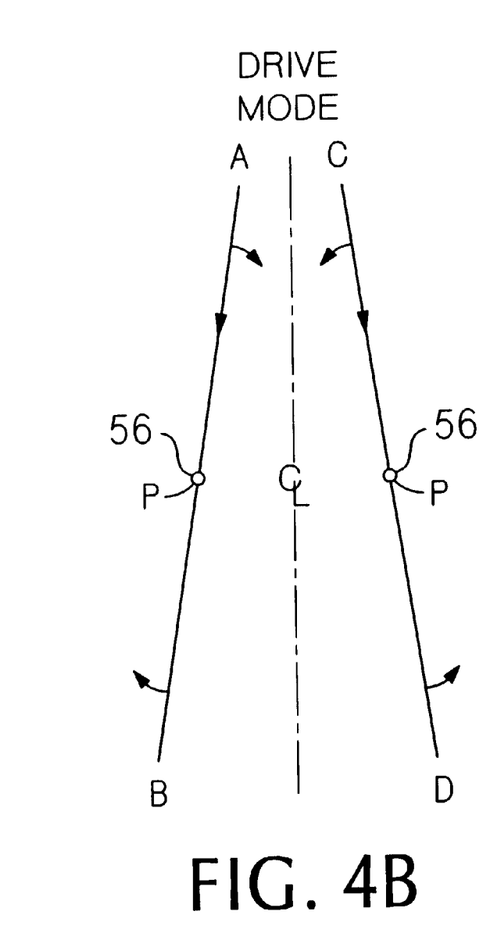
Figure 4C:
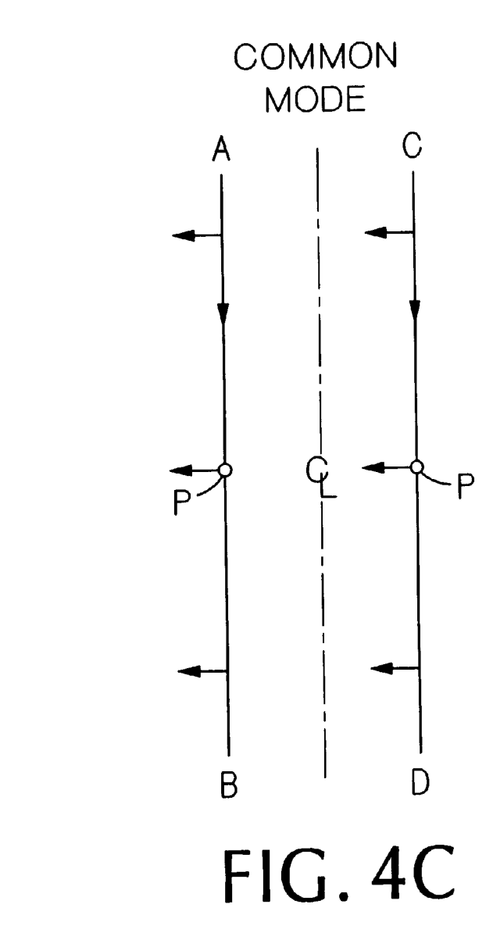

The motions of the straight sections of loops 18 and 20 are shown in three modes in FIGS. 4a, 4b and 4c. In the drive mode shown in FIG. 4b, the loops are driven 180° out-of-phase about their respective points P so that the two loops rotate synchronously but in the opposite sense. Consequently, respective ends such as A and C periodically come together and go apart.

The drive motion shown in FIG. 4b induces the Coriolis mode motion shown in FIG. 4a, which is in opposite directions between the loops and moves the straight sections 26 slightly toward (or away) from each other. The Coriolis effect is directly related to:

$$mv\Omega \cos \omega t,$$

where m is the mass of material in a cross section of a loop, v is the velocity at which the mass is moving (the volumetric flow rate), $\Omega$ and $\omega$ are, respectively, the amplitude and frequency of the angular velocity of the loop, and mv is the mass flow rate. The Coriolis effect is greatest when the two straight sections 26 are parallel as shown in FIG. 4a, because the loops are driven sinusoidally and have a sinusoidally varying angular velocity that is then at its maximum. Accordingly, the Coriolis effect is 90° out-of-phase with the driver signal.

FIG. 4c shows an undesirable common mode motion that deflects the loops in the same direction. This type of motion might be produced by an axial vibration in the pipeline in the embodiment of FIG. 1 because the loops are oriented perpendicular to the pipeline.

The type of oscillation shown in FIG. 4b has come to be called the antisymmetrical mode, and the Coriolis mode of FIG. 4a has come to be called the symmetrical mode. (In some designs, the loops (or loop) are driven in the symmetrical mode, which induces an antisymmetrical mode Coriolis force.) The resonant frequency of oscillation in the antisymmetrical mode is a function of the torsional resilience of the legs. Ordinarily the resonant frequency of the antisymmetrical mode for meters of the shape shown in FIG. 1 is higher than the resonant frequency of the symmetrical mode.

Electronic Design

As discussed in detail below, the mass flowmeter 10 determines the mass flow rate by processing signals produced by sensors located at opposite ends of the loops. The signal produced by each sensor includes a component corresponding to the relative velocity at which the loops are driven by a driver positioned next to the sensor and a component corresponding to the relative velocity of the loops due to Coriolis force induced in each of the loops. Because the loops are driven in the antisymmetrical mode, the components of the sensor signals corresponding to drive velocity will be equal in magnitude but opposite in sign. Because the resulting Coriolis force is in the symmetrical mode, the components of the sensor signals corresponding to Coriolis velocity will be equal in magnitude and sign. Thus, subtracting the signals cancels out the Coriolis velocity components and results in a difference that is proportional to the drive velocity. Similarly, adding the signals cancels out the drive velocity components and results in a sum that is proportional to the Coriolis velocity or force. This sum can then be used to determine the mass flow rate.

The sensors 48 detect the oscillatory motion of the straight sections of the tubes and produce signals that are representative of the oscillatory drive force modulated with the Coriolis reaction force. Because of the close proximity of each driver 46 to its corresponding sensor 48, as shown in FIGS. 1–3, special precautions must be taken to prevent magnetic interference from occurring. That is, the magnetic field from a driver 46 may induce a voltage within a sensor 48, and thereby cause the sensor to produce a spurious signal. Preferably, shielded drivers and sensors are used to prevent such magnetic interference. Such a driver is described in the above-referenced U.S. Pat. No. 5,048,350 to Hussain et al.

Figure 5:
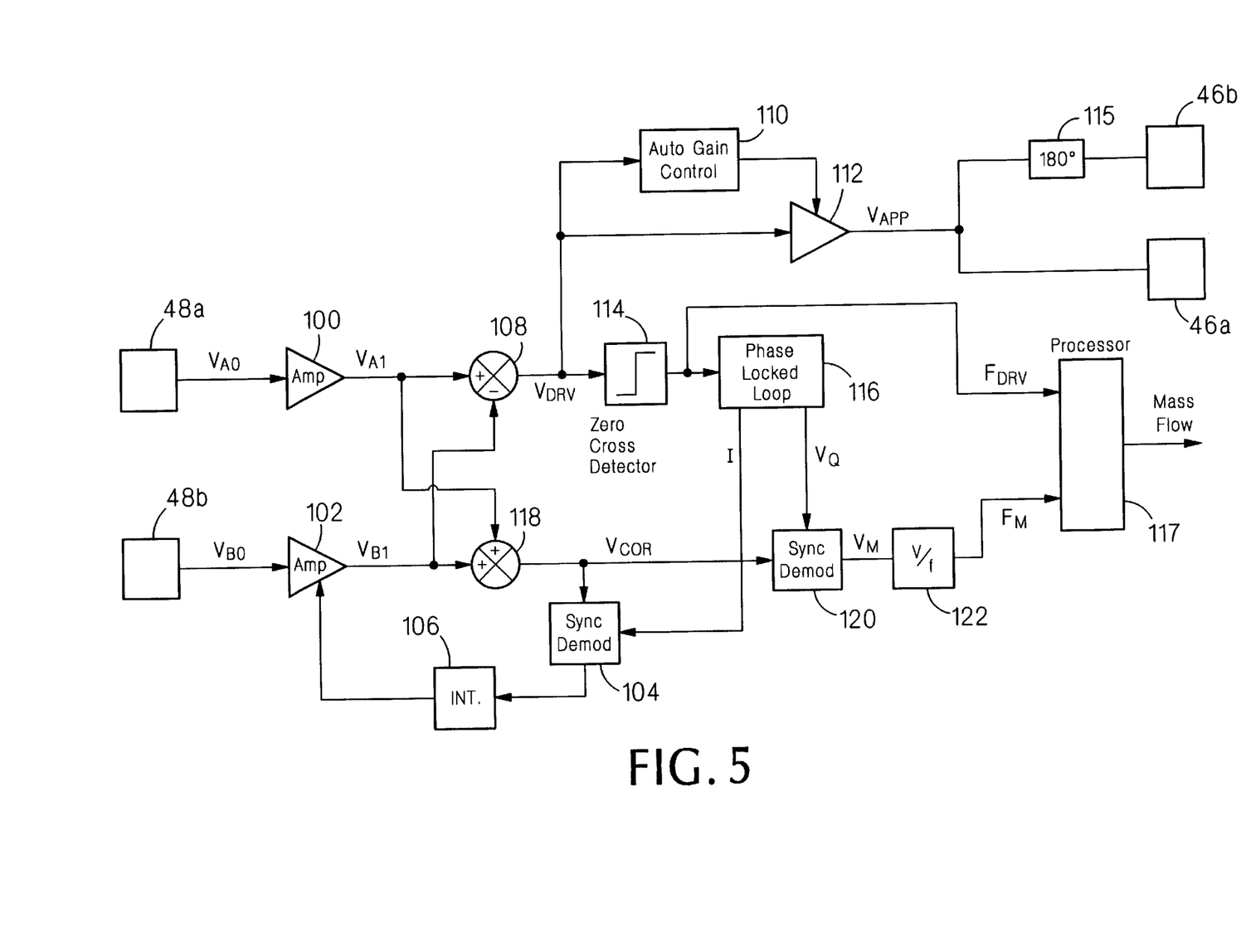
FIG. 5 is a block diagram of a circuit illustrating sensor signal processing in an antisymmetrical drive mode.

During normal operation, loops 18, 20 are driven in the antisymmetrical mode, and signals from sensors 48 are processed as shown in FIG. 5. Signal $V_{A0}$ is a voltage signal from the sensor 48a near the lower rounded turn 38 and signal $V_{B0}$ is a voltage signal from the sensor 48b near the lower rounded turn 40. Signals $V_{A0}$ and $V_{B0}$ correspond to the velocity of the loops relative to each other at the positions of the sensors. The rate of mass flow through meter 10 is related to, and can be determined from, the signals $V_{A0}$ and $V_{B0}$. The density of the material flowing through meter 10 is determined from the frequency of signals $V_{A0}$ and $V_{B0}$.

To determine the mass flow rate and the frequency, signals $V_{A0}$ and $V_{B0}$ are amplified at respective input amplifiers 100 and 102 to produce signals $V_{A1}$ and $V_{B1}$. Due to manufacturing tolerances, the amplitudes of signals $V_{A1}$ and $V_{B1}$ may be mismatched (typically by up to six percent). To correct for this imbalance, input amplifier 102 has a variable gain that is controlled by a balance signal coming from a feedback loop containing a synchronous demodulator 104 and an integrator 106. This allows effective matching of the amplitudes of $V_{A1}$ and $V_{B1}$.

At the output of amplifier 100, signal $V_{A1}$ is of the form:

$$V_{A1} = V_D \sin \omega t + V_C \cos \omega t$$

and, at the output of amplifier 102, signal $V_{B1}$ is of the form:

$$V_{B1} = -V_D \sin \omega t + V_C \cos \omega t$$

where $V_D$ and $V_C$ are, respectively, the amplitudes of the drive mode voltage and the Coriolis mode voltage, and $\omega$ is the antisymmetrical drive mode resonant frequency in radians/sec. Voltages $V_{A1}$ and $V_{B1}$ are differenced by operational amplifier 108 yielding:

$$V_{DRV} = V_{A1} - V_{B1} = 2V_D \sin \omega t$$

where $V_{DRV}$ corresponds to the drive motion and is used to control the drivers.

$V_{DRV}$ is passed through a servo drive loop that includes an automatic gain control 110 and an amplifier 112. An output voltage $V_{APP}$ produced by amplifier 112 in response to $V_{DRV}$ is applied to driver 46a. The output signal also passes through a phase shifter 115 (i.e., an inverting amplifier) that phase shifts the output by 180° and sends the shifted signal to driver 46b. Because the signals sent to drivers 46a and 46b are 180° out of phase, loops 18, 20 are driven in the antisymmetrical mode.

$V_{DRV}$ is also supplied to a positive going zero crossing detector 114. The output, $F_{DRV}$, of zero crossing detector 114 is a square wave having a frequency equal to that of $V_{DRV}$ ($\omega=2\pi f_{DRV}$). $F_{DRV}$ is used as the input to a digital phase locked loop circuit 116, and is supplied to a processor 117.

Voltages $V_{A1}$ and $V_{B1}$ are summed by operational amplifier 118 yielding:

$$V_{COR}=V_{A1}+V_{B1}=2V_C \cos \omega t$$

where $V_{COR}$ corresponds to the induced Coriolis motion.

$V_{COR}$ is supplied to a synchronous demodulator 120 that rejects the components of $V_{COR}$ that do not have the same frequency as, and are not in phase with, a gating signal $V_Q$ to produce an output voltage $V_M$ that is directly proportional to mass. $V_Q$ is a quadrature reference signal that is produced by the phase locked loop circuit 116, has the same angular frequency $\omega$ as $V_{DRV}$, and is 90° out of phase with $V_{DRV}$ (i.e., in phase with $V_{COR}$). Accordingly, synchronous demodulator 120 rejects frequencies other than $\omega$ so that $V_M$ corresponds to the amplitude of $V_{COR}$ at $\omega$.

$V_M$ is supplied to a voltage-to-frequency converter 122 that produces a square wave signal $F_M$ having a frequency $f_M$ that corresponds to the amplitude of $V_M$. The processor 117 then uses $F_M$ to produce a measurement of the mass flow rate. In particular, processor 117 determines mass flow as:

$$\text{mass flow}=f_M * MF,$$

where MF, the meter factor, is determined as:

$$MF=k_c(T)/G\beta\omega V_D,$$

$k_c(T)$ is the static spring constant of the Coriolis mode, which is a function of T, the temperature of the flow tube, G is a constant for the meter, and $\beta$ is a magnification factor associated with the meter. Of these parameters, $k_c(T)$ and G are known based on the meter design, T and $\omega$ may be measured, and $V_D$ is controlled so that only $\beta$ is undefined. The magnification factor, $\beta$, may be determined during meter calibration by applying a known mass flow to the meter. Thereafter, $\beta$ can be used in generating the meter factor.

The phase locked loop circuit 116 also produces a reference signal I that is in phase with $V_{DRV}$. This signal gates the synchronous demodulator 104, which synchronously demodulates the Coriolis signal $V_{COR}$ to produce a signal used in the feedback control of the gain of the amplifier 102. When the gains of the input amplifiers 100 and 102 multiplied by the drive components of the corresponding input signals equal each other, the summing operation at operational amplifier 118 produces zero drive component (proportional to $V_{DRV}$) in the signal $V_{COR}$. When the gains of the input amplifiers 100 and 102 are not equal, a drive component, which is extracted by synchronous demodulator 104 gated by reference signal I, exists. The drive component is extracted as a direct current component that is integrated by integrator 106 to generate an error voltage to correct the gain of input amplifier 102.

Monitoring and Predicting Tube Performance

One approach to monitoring and predicting tube failure is to observe changes in the ratio of two resonant frequencies of the Coriolis-type mass flowmeter tubes. For example, the two resonant frequencies of the flowmeter tubes can be chosen to be the antisymmetrical drive frequency $f_{DRV}$ and the symmetrical drive frequency $f_{DRV}'$. Monitoring changes in this ratio will indicate changes in the mass and stiffness of the tubes, which are caused primarily by the loss or deposition of materials that may occur due to erosion and corrosion.

When an abrasive process fluid is causing erosion, it is reasonable to conclude that the erosion would not be uniform and in fact would be considerably more severe in the curved sections of the tube than the straight sections. In contrast, the deposition of materials from the process stream on the inner wall of the tube would be less severe in the curved sections of the tube. Under either of these conditions the ratio of the drive resonant frequency $f_{DRV}$ to the Coriolis resonant frequency $f_{COR}$ would change.

Figure 6:
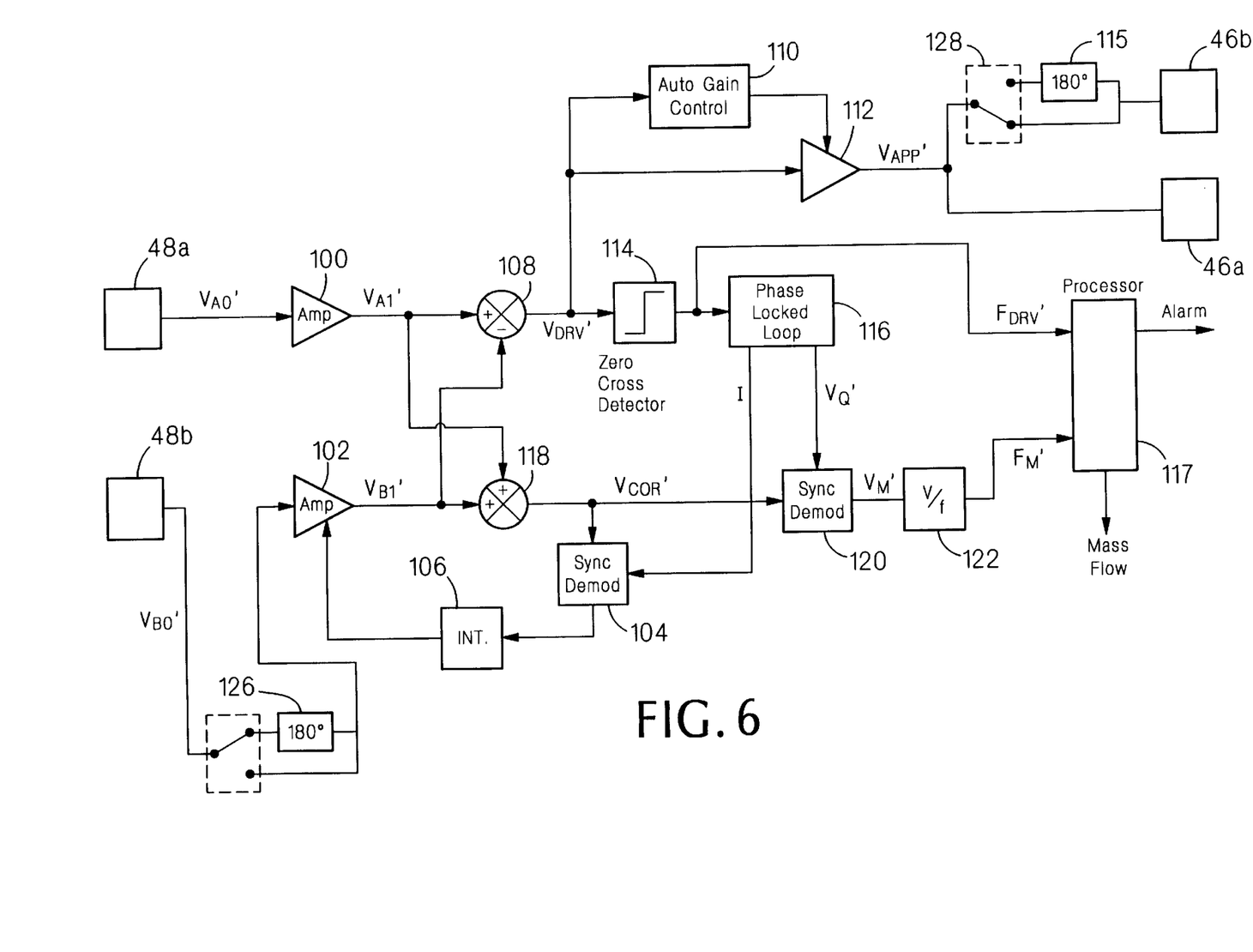
FIG. 6 is a block diagram of a circuit illustrating sensor signal processing in a symmetrical drive mode.

As illustrated in FIG. 6, this approach takes advantage of the dual drivers of the flowmeter by actively driving the meter in the symmetrical mode to generate symmetrical drive frequency $f_{DRV}'$, which is the Coriolis resonant frequency $f_{COR}$. This approach requires only slight modification of the system of FIG. 5. In particular, a switch 124 and a phase shifter 126 are added between sensor 48b and input amplifier 102, and a switch 128 is added between amplifier 112 and driver 46b. When the meter is driven in antisymmetrical mode (not shown), switch 124 is positioned to bypass phase shifter 126 and switch 128 is positioned to direct the signal through phase shifter 115. By contrast, when the meter is driven in symmetrical mode, switch 124 is positioned to direct the signal from sensor 48a through phase shifter 126 and switch 128 is positioned to bypass phase shifter 115. (Switches 124 and 128 are controlled by processor 117.)

The symmetrical drive frequency $f_{DRV}'$ is determined by changing switch 128 so that drivers 46a, 46b are driven by signals that are in phase. In this case, loops 18, 20 are driven in symmetrical mode, and sensors 48 produce signals $V_{A0}'$ (from sensor 48a) and $V_{B0}'$ (from sensor 48b) that are amplified at respective input amplifiers 100 and 102 to produce signals $V_{A1}'$ and $V_{B1}'$.

At the output of amplifier 100, signal $V_{A1}'$ is of the form:

$$V_{A1}'=V_D' \sin \omega't+V_C' \cos \omega't$$

and, at the output of amplifier 102, signal $V_{B1}'$ is of the form:

$$V_{B1}'=-V_D' \sin \omega't+V_C' \cos \omega't$$

where $V_D'$ and $V_C'$ are, respectively, the amplitudes of the drive mode voltage and the Coriolis mode voltage, and $\omega'$ is the symmetrical drive mode resonant frequency in radians/sec. Voltages $V_{A1}'$ and $V_{B1}'$ are differenced in operational amplifier 108 yielding:

$$V_{DRV}'=V_{A1}'-V_{B1}'=2V_D' \sin \omega't$$

where $V_{DRV}'$ is supplied to amplifier 112 and the output of amplifier 112 is sent as drive signal $V_D'$ to drivers 46a and 46b. Because the same signal is sent to drivers 46a and 46b, loops 18, 20 are driven in the symmetrical mode.

$V_{DRV}'$ is also supplied to positive going zero crossing detector 114, the output of which is used as the input to digital phase locked loop circuit 116. $F_{DRV}'$ is extracted from the output of digital phase locked loop circuit 116 ($\omega'=2\pi f_{DRV}'$).

Meter operation can be switched between the antisymmetric and symmetric modes of operation with little interruption in system output because processor 117 produces the mass flow signal when driving the meter in the symmetric mode. Thus, the mass flow signal is interrupted and unavailable only during transitions between the antisymmetric and symmetric modes.

Figure 7:
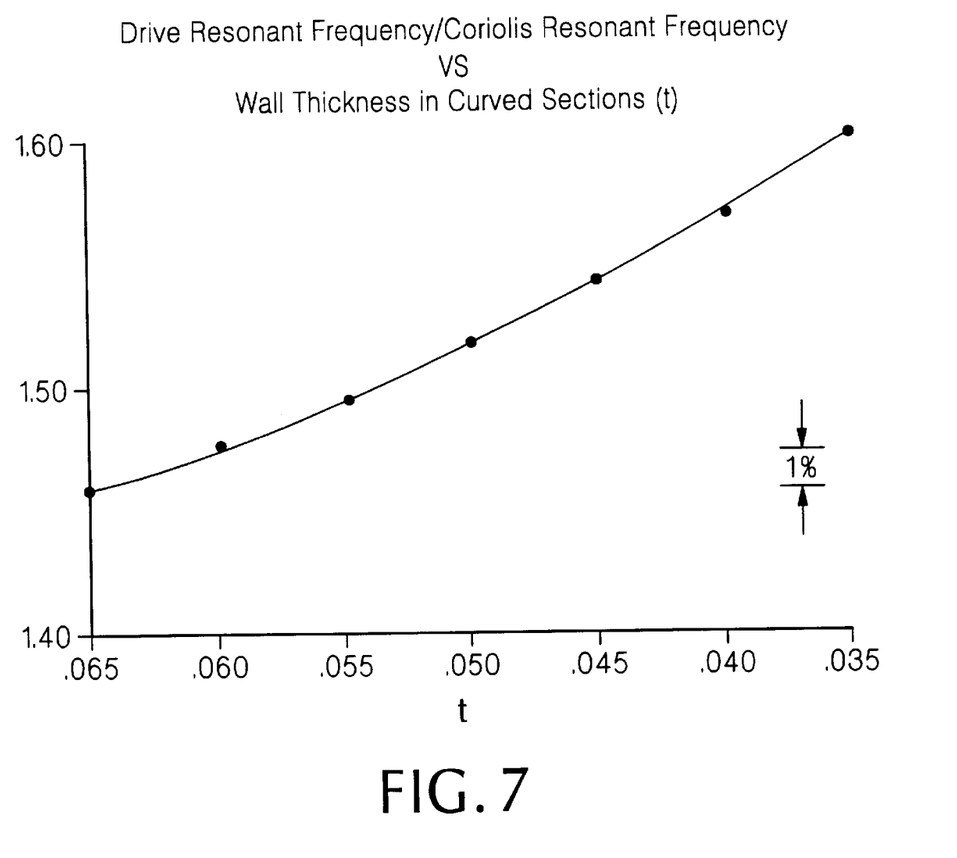
FIG. 7 is a graph of a ratio of symmetric to antisymmetric resonance frequencies relative to tube wall thickness.
Figure 8:
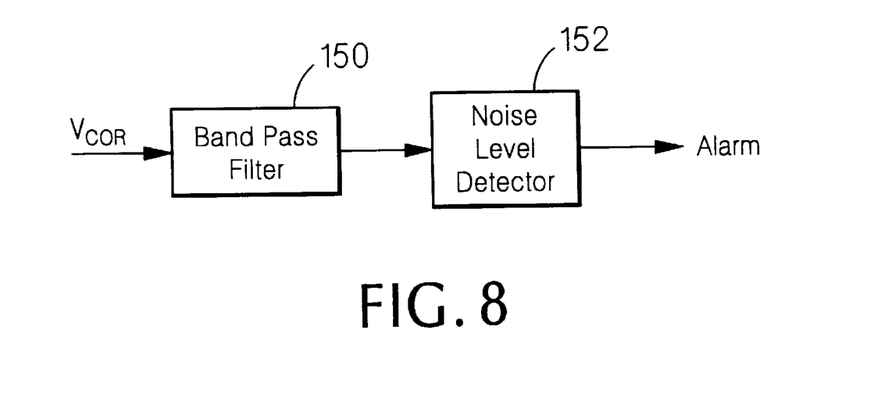
FIG. 8 is a block diagram of a circuit to analyze the noise spectrum.

As illustrated in FIG. 7, a ratio between $f_{DRV}$ and $f_{DRV}'$ varies with the thickness of the tube walls so that variations in the ratio are indicative of potential tube failure. By supplying $F_{DRV}$ and, at a later time, $F_{DRV}'$ directly to the processor 117, extracting the frequencies of those signals, and storing values of the frequencies using memory locations within the processor, the processor can divide the values to produce the required ratio.

When the ratio of the frequencies deviates beyond a preset amount from a reference signal that is indicative of an initial or expected value, the processor 117 can be instructed to produce an alarm signal that engages an alarm (not shown) or causes the flowmeter to automatically shut down. The change in the ratio of the frequencies is indicative of corrosion or erosion of the tubes with a resultant loss of stiffness or mass. This, in turn, is indicative of future loss of structural integrity and/or increased likelihood of fatigue failure or error in measurement accuracy.

The symmetrical drive frequency $f_{DRV}'$ may also be used to modify the meter factor based on meter wear. The modified meter factor, $MF_{MOD}$, may be expressed as:

$$MF_{MOD} = MF^*(\beta_{ref}/\beta_{measured}),$$

where $\beta_{ref}$ is the factor determined at calibration and $\beta_{measured}$ is determined as:

$$\frac{1}{\beta_{measured}^2} = \left[1 - \left(\frac{f_{DRV}}{f_{DRV}'}\right)^2\right]^2 + \frac{1}{Q_c^2}\left(\frac{f_{DRV}}{f_{DRV}'}\right)^2$$

where $1/Q_c$ equals twice the damping factor of the Coriolis mode. Typically, the second term of the expression is substantially smaller than the first, and can be ignored so that $\beta_{measured}$ is determined as:

$$\frac{1}{\beta_{measured}} = \left[1 - \left(\frac{f_{DRV}}{f_{DRV}'}\right)^2\right]$$

The correction to the meter factor MF is carried out by the processor 117.

Another approach related to actively driving in the symmetrical mode is to actively drive any secondary mode of vibration on the tubes that, like the symmetrical mode, is normal to the primary drive mode of oscillation. As before, one or more drivers of the flowmeter are thus used to drive any secondary mode of vibration of the tubes at a different resonant frequency than the primary drive mode.

An approach to monitoring flowmeter tube fatigue is to monitor the frequency spectrum of the signal coming from the sensors 48. A circuit to analyze the noise spectrum is shown schematically in FIG. 8. The Coriolis signal $V_{COR}$, for example, is supplied to a band pass filter 150 that filters out signal components whose frequencies are below the drive frequency $F_{DRV}$, and passes the higher frequency noise portion of the spectrum. The signal output from band pass filter 150 is input to a noise level detector 152 that is thresholded to detect energy in the higher noise portion of the spectrum. The higher noise portion of the spectrum reveals the presence of fatigue in the tubes. As the tubes fatigue, microcracks that result in increased frictional losses during vibration of the tubes are formed. Consequently, there is increased high frequency noise. By comparing changes in the noise spectrum over a period of time, by monitoring the amount of energy of tube vibration shifting into the noise portion of the frequency spectrum, incipient tube failure can be predicted. For example, when the total amount of vibrational energy in the noise portion of the frequency spectrum exceeds a predetermined threshold value, as indicated by the noise level detector 152, an alarm (not shown) is set or the flowmeter is caused to automatically shut down.

Tube fatigue should result in significant changes in the noise spectrum, but may produce a lesser change in the ratio between resonant or driven frequencies.

Another way of detecting tube failure is to look directly at the energy loss in the vibrating tubes, rather than at the amount of vibrational energy ending up in the noise portion of the frequency spectrum. Looking directly at the energy loss in the vibrating tubes is equivalent to looking at decreases in the mechanical Q of the vibrating tubes, where:

$$Q = \frac{\text{energy stored}}{\text{energy lost / cycle}}$$

or alternatively, looking at increases in the damping ratio of the vibrating tubes.

Figure 9:
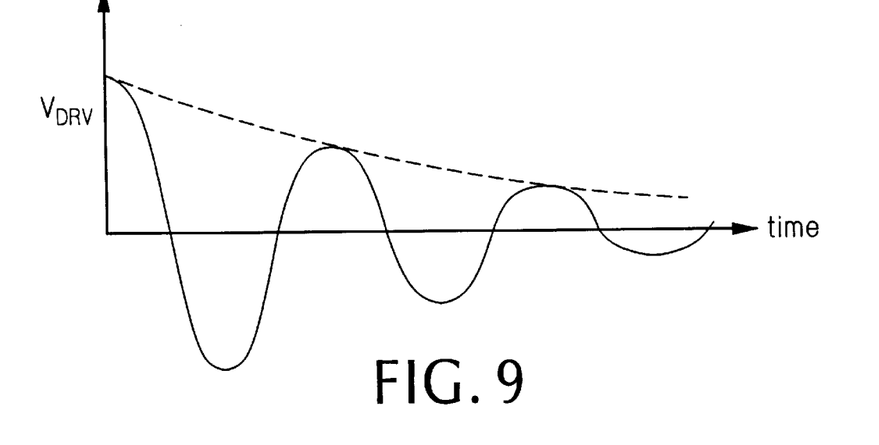
FIG. 9 is a graph of a decaying drive signal.
Figure 10:
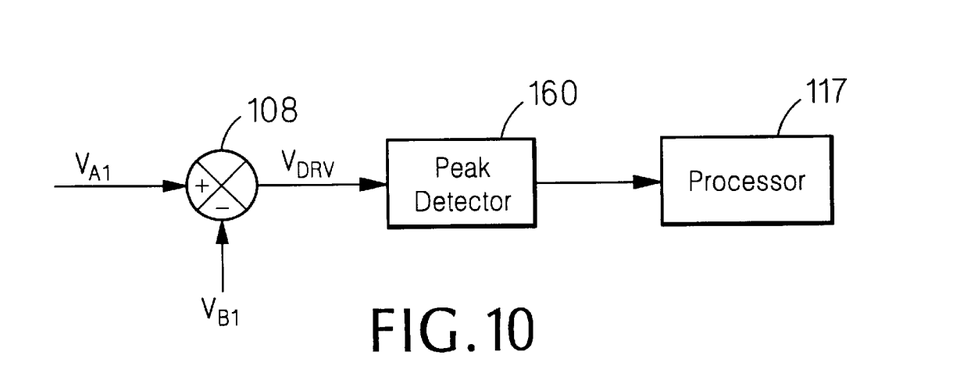
FIG. 10 is a block diagram of a circuit to analyze the signal of FIG. 9.

In the normal operating mode, the power to the drivers 46 can be suddenly interrupted for a short period of time. The resulting decaying signal, as shown in FIG. 9, can then be electronically observed, and the damping can be determined by measuring the log decrement of the decaying drive mode. As shown in FIG. 10, the decaying signal can be observed using a peak detector 160 configured to receive the decaying drive signal and to provide an output signal to the processor 117. The formation of microcracks in the tubes or the presence of corrosion or erosion will result in additional vibrational energy loss that will decrease Q and increase the damping ratio. If the damping ratio or Q value is compared with that initially calibrated on the tubes, it is possible to set a limit after which the flowmeter should no longer be used. This is primarily a way of monitoring tube failure.

Figure 11:
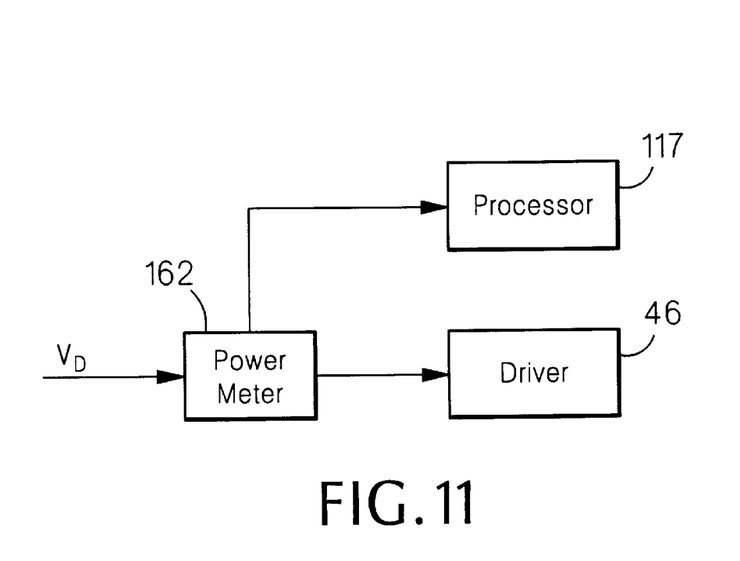
FIG. 11 is a block diagram of circuit to monitor power delivered to the meter.

A preferred way of monitoring Q and the damping ratio, and hence tube failure, is to monitor the power delivered to the tubes to maintain a constant vibrational tube velocity. As shown in FIG. 11, the power may be monitored using a power meter 162 configured to receive the drive signal provided to the drivers 46 and to provide a measure of the power thereof to the processor 117. No interruption in the primary flow measurement is required in this monitoring method. For a flowmeter system where the tube velocity is controlled, measurement of the drive current gives the amount of power delivered to the tubes simply and directly. If the drive current begins to rise due to the lowering of the Q value of the tubes, this indicates incipient failure of the Coriolis tubes.

Combinations of the above-mentioned approaches can be used for detecting one or more of the most likely failure mechanisms in Coriolis flowmeters: corrosion, erosion, deposit build up, and fatigue.

What is claimed is:

1. A method for determining mechanical deterioration of a vibrated conduit in a Coriolis-type mass flowmeter comprising a conduit, at least one driver for driving said conduit about a drive axis, and at least one sensor for sensing the motion of said conduit; said method comprising the steps of:

driving said conduit about said drive axis, sensing the motion of said conduit, producing from the sensed motion a first signal representative of a first aspect of said motion, and producing from the sensed motion a second signal representative of a second, different aspect of said motion, monitoring a change in a value of the first signal relative to a value of said second signal, and signalling an alarm response when said change in said relative value of the first signal exceeds a predetermined threshold value indicative of excessive mechanical deterioration.

2. The method of claim 1, wherein said monitoring step includes generating a ratio between said values of said first and second signals.

3. The method of claim 1 or 2, wherein said first and second signals correspond to two resonant frequencies associated with said conduit.

4. The method of claim 3, wherein said resonant frequencies are in the symmetrical and antisymmetrical modes of oscillation.

5. The method of claim 4, wherein said flowmeter includes two drivers, further comprising:

driving the symmetrical mode with said two drivers while recording the resonant frequency thereof, and driving the antisymmetrical mode with said two drivers while recording the resonant frequency thereof.

6. The method of claim 5, wherein the normal driven mode for normal operation of the flowmeter is antisymmetrical, and the step of driving the symmetrical mode with said two drivers is performed on command for the purpose of testing for mechanical degradation of the tube.

7. The method of claim 1, further comprising:

interrupting a drive signal that causes said conduit to oscillate about said drive axis;

monitoring decay of the oscillation of said conduit to determine a damping factor for said conduit; and signalling an alarm response when a change in said damping factor exceeds a predetermined threshold value indicative of excessive mechanical deterioration.

8. The method of claim 7, wherein the damping factor is determined based on a log decrement of the oscillation of said conduit.

9. A method for determining mechanical deterioration of a vibrated conduit in a Coriolis-type mass flowmeter comprising a conduit, at least one driver for driving said conduit about a drive axis, and at least one sensor for sensing the motion of said conduit; said method comprising the steps of:

driving said conduit about said drive axis, sensing the motion of said conduit and producing one or more signals representative of said motion, monitoring a noise portion of the frequency spectrum of at least one of said signals corresponding to frequency components of the motion higher than a predetermined threshold value, and signalling an alarm response when an increase in the noise portion of the frequency spectrum exceeds a predetermined threshold noise value.

10. A method for determining mechanical deterioration of a vibrated conduit in a Coriolis-type mass flowmeter comprising a conduit, at least one driver for driving said conduit about a drive axis, and at least one sensor for sensing the motion of said conduit; said method comprising the steps of:

driving said conduit about said drive axis, sensing the motion of said conduit and producing signals representative of different aspects of said motion, monitoring a change in the ratio of values of said signals, signalling an alarm response when said change in said ratio exceeds a predetermined threshold value indicative of excessive mechanical deterioration, monitoring a noise portion of the frequency spectrum of at least one of said signals corresponding to frequency components of the motion higher than a predetermined threshold value, and signalling an alarm response when an increase in the noise portion of the frequency spectrum exceeds a predetermined threshold noise value.

11. A method for determining mechanical deterioration of a vibrated conduit in a Coriolis-type mass flowmeter comprising a conduit, at least one driver for driving said conduit about a drive axis, and at least one sensor for sensing the motion of said conduit; said method comprising the steps of:

driving said conduit about said drive axis, sensing the motion of said conduit, producing from the sensed motion a first signal representative of a first aspect of said motion, producing from the sensed motion a second signal representative of a second, different aspect of said motion, generating a ratio of values of said first and second signals, detecting excessive mechanical deterioration of the conduit by comparing a change in the ratio of values of said first and second signals to a predetermined threshold value indicative of excessive mechanical deterioration of the conduit, signalling an alarm response when said change in said ratio exceeds the predetermined threshold value indicative of excessive mechanical deterioration.

12. A method for determining mechanical deterioration of a vibrated conduit in a Coriolis-type mass flowmeter comprising a conduit, at least one driver for driving said conduit about a drive axis, and at least one sensor for sensing the motion of said conduit; said method comprising the steps of:

driving said conduit about said drive axis, sensing the motion of said conduit and producing signals representative of said motion, monitoring a noise portion of the frequency spectrum of at least one of said signals corresponding to frequency components of the motion higher than a predetermined threshold value, signalling an alarm response when an increase in the noise portion of the frequency spectrum exceeds a predetermined threshold noise value, monitoring power delivered to said conduit necessary to maintain a constant vibrational conduit velocity, and signalling an alarm response when an increase in the power delivered exceeds a predetermined threshold power value.

13. A method for determining mechanical deterioration of a vibrated conduit in a Coriolis-type mass flowmeter comprising a conduit, at least one driver for driving said conduit about a drive axis, and at least one sensor for sensing the motion of said conduit; said method comprising the steps of:

producing a drive signal that drives said conduit about said drive axis;

sensing the motion of said conduit and producing a motion signal representative of said motion, interrupting the drive signal;

monitoring said motion signal to monitor decay of the oscillation of said conduit to determine a damping factor for said conduit; and signalling an alarm response when a change in said damping factor exceeds a predetermined threshold value indicative of excessive mechanical deterioration.

14. The method of claim 13, wherein the damping factor is determined based on a log decrement of the oscillation of said conduit.

15. The method of claim 1, further comprising monitoring a noise portion of the frequency spectrum at least one of said signals corresponding to frequency components of the motion higher than a predetermined threshold value, and signalling an alarm response when an increase in the noise portion of the frequency spectrum exceeds a predetermined threshold noise value.

16. The method of claim 15, further comprising:

monitoring power delivered to said conduit necessary to maintain a constant vibrational conduit velocity, and signalling an alarm response when an increase in the power delivered exceeds a predetermined threshold power value.

17. The method of claim 1, further comprising:

monitoring power delivered to said conduit necessary to maintain a constant vibrational conduit velocity, and signalling an alarm response when an increase in the power delivered exceeds a predetermined threshold power value.

18. The method of claim 1, further comprising modifying operation of the flowmeter based on the sensed motion of the conduit.

19. The method of claim 18, further comprising modifying a parameter of the flowmeter used in calculating a mass flow measurement based on the sensed motion of the conduit.

20. The method of claim 19, wherein modifying a parameter of the flowmeter used in calculating the mass flow measurement comprises modifying the parameter based on a ratio of a resonant frequency of the conduit in the symmetrical mode with a resonant frequency of the conduit in the antisymmetrical mode.

* * * * *